D. JONES.
Couplings for Pipes and Oil-Well Tubing.
No. 142,792.          Patented September 16, 1873.
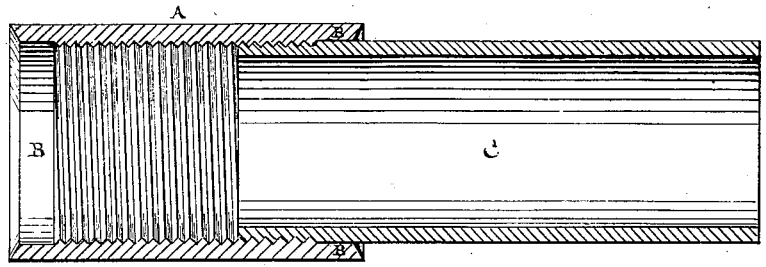
Witnesses.
F. W. Howard
E. R. Stansbury
Inventor.
Daniel Jones
By his Attorney
Chas. F. Stansbury

UNITED STATES PATENT OFFICE

DANIEL JONES, OF BOSTON, MASSACHUSETTS, ASSIGNOR OF ONE HALF HIS RIGHT TO NATIONAL TUBE WORKS COMPANY, OF SAME PLACE.

IMPROVEMENT IN COUPLINGS FOR PIPE AND OIL-WELL TUBING.

Specification forming part of Letters Patent No. 142,792, dated September 16, 1873; application filed June 19, 1871.

*To all whom it may concern:*

Be it known that I, DANIEL JONES, of Boston, in the county of Suffolk and State of Massachusetts, have invented a new and useful Coupling for Pipes and Oil-Well Tubing; and I do hereby declare the following to be a full and correct description of the same, reference being had to the accompanying drawing, which is a longitudinal section of a piece of tubing with my improved coupling applied.

I have found, in the use of great lengths of tubing made by coupling pipes together, as in the tubing of oil-wells, that there is a great tendency of the tube to break off at the end of the coupling, the line of fracture coinciding almost invariably with the last thread of the screw cut upon the tubing. This is a serious inconvenience as well as a great expense.

To remedy it I have essayed with success the use of a coupling in which there is, at each end, a smooth portion, which I call the sleeve, projecting beyond the female screw cut upon the interior of the coupling, which receives the threaded portion of the tube.

This is clearly illustrated in the drawing, in which A marks the coupling; B, the sleeve or smooth portion of the coupling, and C the tube, the threaded end of which is received by the female screw of the coupling A. The sleeve B projects, as shown, beyond the threaded portion of the tube C, and fits snugly upon the tube, stiffening and strengthening the joint, and preventing its liability to be broken by the oscillation of the tube.

Having thus fully described my invention, what I claim, and desire to secure by Letters Patent, is—

The combination, with the tubing of oil-wells, of the coupling A, having the sleeve B, all constructed and united in the manner and for the purpose specified.

The above specification of my said invention signed and witnessed at Petroleum Centre this 8th day of May, A. D. 1871.

DANIEL JONES.

Witnesses:
S. P. ARMSTRONG,
G. L. LAWRENCE.